United States Patent [19]

Drummond

[11] 3,903,937

[45] Sept. 9, 1975

[54] BACK WIRING

[75] Inventor: Peter R. Drummond, Culver City, Calif.

[73] Assignee: Xerox Corporation, Stamford, Conn.

[22] Filed: Apr. 23, 1971

[21] Appl. No.: 136,949

Related U.S. Application Data

[62] Division of Ser. No. 743,904, July 10, 1968, Pat. No. 3,603,357.

[52] U.S. Cl. .......... 140/147; 29/630 D

[51] Int. Cl.² .......... B21F 1/02

[58] Field of Search .......... 140/147, 149, 119; 29/630 A, 629, 626, 630 D; 72/DIG. 10, 121, 125

[56] References Cited

UNITED STATES PATENTS

| | | | |
|---|---|---|---|
| 2,609,858 | 9/1952 | Engel | 72/DIG. 10 |
| 2,869,129 | 1/1959 | Rogers | 72/DIG. 10 |
| 3,337,949 | 8/1967 | Weigel | 29/630 D |
| 3,349,813 | 10/1967 | Pastuszak | 140/147 |
| 3,462,540 | 8/1969 | Harris, Jr. et al. | 29/626 X |
| 3,580,297 | 5/1971 | Spadoni | 140/149 |
| 3,591,922 | 7/1971 | Pardee | 29/626 |
| 3,603,357 | 9/1971 | Drummond | 140/147 |
| 3,700,011 | 10/1972 | Walter | 140/147 |

*Primary Examiner*—C. W. Lanham
*Assistant Examiner*—M. J. Keenan
*Attorney, Agent, or Firm*—Ellsworth R. Roston

[57] ABSTRACT

A method for straightening connector pins is disclosed as a preparatory measure for the stringing of wires between the pins. The pins are first anchored in a mounting board which is run subsequently through a pin straightening machine. The pins, when bent, are individually deflected to assume the desired position, and they are twisted around the respective axis defining that desired position, beyond the elastic limit for torsional deformation.

21 Claims, 13 Drawing Figures

INVENTOR:
Peter R. Drummond

By Smyth, Roston & Pavitt

ATTORNEYS

INVENTOR:
Peter R. Drummond

By Smyth, Renton & Pavitt

ATTORNEYS

INVENTOR:
Peter R. Drummond

By [signature]

ATTORNEYS

INVENTOR:
Peter R. Drummond

By Smyth, Roston & Pavitt

ATTORNEYS

INVENTOR:
Peter R. Drummond

By Smyth, Roston & Pavitt
ATTORNEYS

BACK WIRING

This is a division of application Ser. No. 743,904, filed July 10, 1968 now U.S. Pat. No. 3,603,357.

The present invention relates to a method, system and machine for improving chassis backwiring of electrical equipment, and more particularly for improving preparation of connecting pins to be interconnected through wires.

Electrical equipment employing a multitude of electrical circuit elements, such as an electronic digital computer, is ususally constructed so that the various elements and components are mounted on printed circuit cards to constitute appropriate modules. Contact etchings leading to and from the several circuit elements on a module are usually arranged along one edge of the printed circuit card, and terminal pin-type connectors make contact with these terminal contact etchings so that one or two rows of pins appear to project from the rear edges of the several cards. The module cards are mounted in a chassis and the pins of the several connectors appear to be arranged in a matrix pattern in the near plane of the chassis. Circuit elements on different modules are interconnected through wires usually strung between respective two of the several pins, and the multitude of wires necessary to complete the desired electric circuit, constitutes the chassis backwiring. In a typical case there may be thousands of pins to be interconnected by such backwiring.

So-called wire-wrap machines have been developed which automatically, and in accordance with a particular program, interconnect pairs of pins in accordance with the desired electrical circuit connection. The wiring machine provides these interconnections by wrapping the two ends of a wire firmly around the two pins to be interconnected and in several turns on each pin. In order to prevent these turns from slipping off a pin, the pins are usually constructed with rectangular or square cross section. This has reduced the number of cases where wires have slipped off but further improvement here is highly desirable. Moreover, for proper operation of such a wire-wrap-machine, the pins must be accurately positioned; they must extend parallel to each other and transverse to the backwiring plane. A bent pin may damage the wiring machine and, or course, impedes or even interrupts proper operation thereof.

It is an object of the present invention to particularly prepare the arrangement of pins so as to obviate these problems. For explaining the complete method and system of the invention, it is presumed that the pins are mounted in plastic connector bodies, as is conventional, without being firmly and positively anchored therein. If that were not the case, the method of the invention could be somewhat simplified, as will be explained. Furthermore, it is presumed that a plastic, printed circuit-type mounting board having apertures is provided for assembling and positioning all the various pins for placement in the wire-wrap machine. The pins are mounted in connector bodies, there being usually as many connectors as there are printed circuit cards for which the pin connectors provide input and output terminals. The pins, as projecting from the several connectors, are stuck into the mounting board to assemble all of the pins of all of the connectors in the desired relationship.

In accordance with the invention, it is suggested as a first, preliminary step, to insert the pins of the several connectors (to which, on the respective other side, will be connected later on the individual printed circuit cards) into the mounting board and in a manner that the pins completely traverse that board and become exposed on the other side thereof. It is further suggested to individually solder the pins to the board without making electrical contact with the grounded layer thereon, except in the situation mentioned above. This way, the pins are firmly anchored to the mounting board to the extent that any twisting of a pin will not dislocate the pin where anchored. These two preliminary steps are necessary if the contact pins are not firmly anchored to the body of the terminal connector for the module cards. If, however, the pins are firmly anchored in such a connector, and in a manner that twisting will not dislocate a pin, soldering to the ground plane board is not necessary.

In accordance with the next step of the invention, the mounting board having the several pins anchored thereto is particularly positioned to obtain particular and predeterminable relationship to a tool to be described in the following. This tool is comprised of at least one, preferably a plurality of chucks, and means are provided to place chucks and pins into an indexing relationship. The indexing relationship is defined in that the center axis of a chuck is placed coaxial with the axis of alignment for the respective pin which runs through the center of the respective anchoring point of the pin. For one pin straightening operation at least one of the chucks is in such indexing relationship with a pin. If there are less chucks than pins, several such pin straightening operations will have to be carried out on a cyclic basis to cover all of the pins on the board.

During each pin straightening cycle, chuck and pin are moved towards each other on that axis; a flared portion of the chuck may grip a bent pin and urge the pin, so that pin tip and anchoring point become located on the alignment axis defining the desired pin position. The chuck is provided with an aperture for gripping the tip of the pin. That aperture has mating configuration for the pin cross section, and the flared chuck portion merges into that aperture. Preferably, the pins have a non-round cross section so that the mating aperture can engage the pin and turn it without further clamping action. The chucks are preferably positioned to have some rotational slack so that a chuck can align itself for profile alignment between aperture and pin tip as the pin tip is guided by the flared chuch opening into the aperture during chuck — pin approach.

In the next step the chuck turns about the alignment axis to apply a twist to the pin beyond the elastic limits of torsional deformability thereof. Of course, turning of the chuck is stopped before the pin could break. A beryllium copper, gold-plated pin, having a length of about three fourth inch and a diameter or 25 mills, may be twisted, for example, by 180°. The twist producing force is then removed from the chuck, so that the twisted pin can relax to some extent before the chuck is removed from the tip of the pin. However, as the pin was twisted beyond the elastic limit, the pin will remain twisted at least to some extent. Most importantly, the pin will be straight, even if lateral urging during the chuck-pin approach did not bend the pin permanently.

If there are fewer chucks than pins, the board with the pins is advanced to place another pin under the chuck to repeat the operation for straightening this pin. As stated above, the pins are preferably arranged in rows and columns. Accordingly, chucks are preferably arranged in at least one row, and the board with pins is moved between pin straightening cycles along the direction of pin columns and over a distance equal to the distance between two rows of pins. It has been found that pins are adequately straightened in that manner, and after wrapping of wire around the pin near the anchoring point, the probability of slipping off is greatly reduced.

For obtaining such cyclic operation the mounting board with pins is placed on a movable table of a novel pin straightening machine; the chucks are arranged in two rows on a vertically movable carriage of the machine. The table is advanced in steps under the carriage. During each stop the carriage is lowered and the chucks on each row engage every other pin of a pin row, and twist the respective pins. After twisting, the chucks release the pins, first through establishing torque-interaction free condition as between chuck and pin, and second by having the carriage lift the chucks. Subsequently the table advances by one step for a distance equal to the distance between two rows, to place another set of pins under the chucks, whereupon twisting is repeated.

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

Figures 9, 10, 10A, 11:
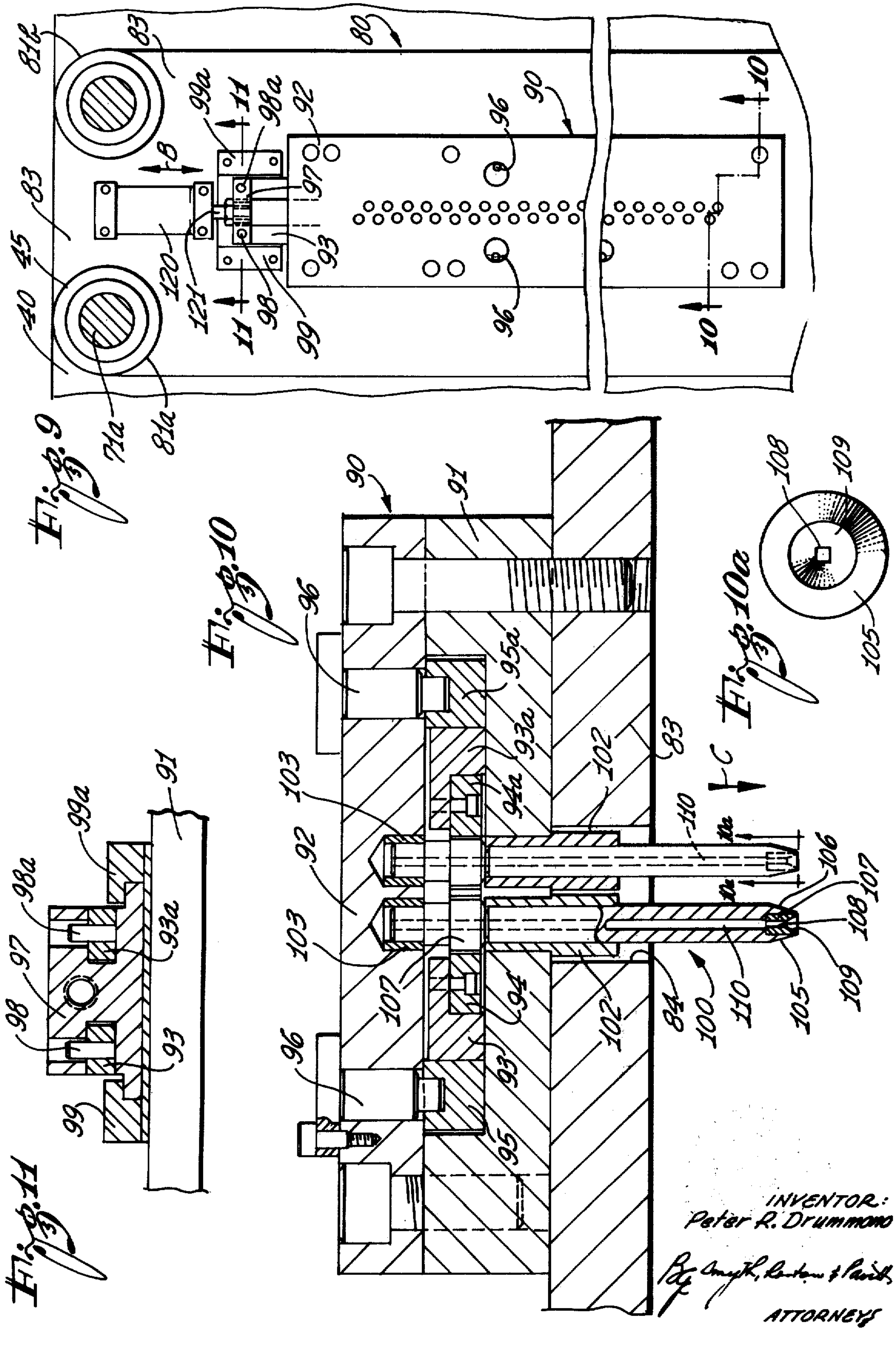
FIG. 9 is a section view of the machine along line 9—9 in FIG. 7.

FIGS. 10 and 11 are section views along lines 10—10 and 11—11 respectively in FIG. 9, with FIG. 10 drawn to twice the scale size as FIG. 11;

FIG. 10*a* is a view into one of the chucks shown in FIG. 11, and from below, as indicated; and FIG. 12*a* to 12*d* illustrate different phases of the pin straightening operation, showing chuck and tip pin in different relations.

Proceeding now to the detailed description of the drawings, the figures are organized to describe elements, tools and equipment in sequence of employment for practicing the invention, with regard to the preparation of connector pins for backwiring. It is particularly presumed that contact pins are not anchored sufficiently to a pin connector body to permit twisting of a pin in a manner that the anchoring retains the pin upon application of a twisting force to the pin tip.

Figures 1, 2, 3, 4, 5:
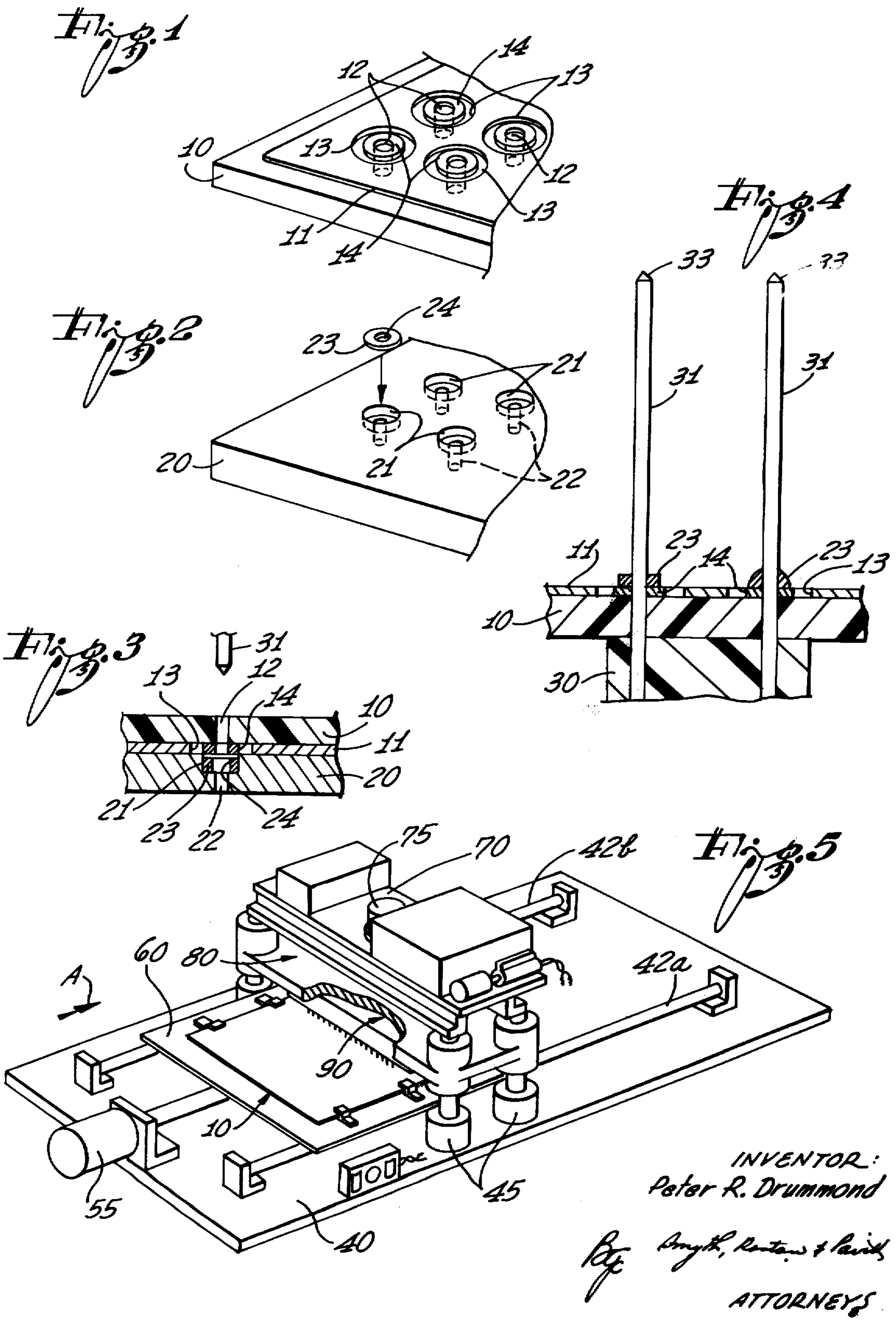
FIG. 1 is a perspective view of a portion of a mounting board for connector pins.
FIG. 2 is a perspective view of an assembly tool for particularly placing solder rings.
FIG. 3 is a cross section through a portion of the tool shown in FIG. 2 and of the board shown in FIG. 1, positioned for placing connector pins and solder rings into particular position on the mounting board.
FIG. 4 is a cross section through portion of the mounting board with pins and pin connector in partial attachment.
FIG. 5 is an overall perspective view of a pin straightening machine for practicing the invention in accordance with the preferred embodiment.

Turning first to FIG. 1, there is illustrated somewhat schematically, a portion of a mounting board which is comprised of a plastic board 10, made of material as is commonly used for printed circuit cards, such as a material traded under the name of epoxy, or the like. At least one side of the board is provided with a metallic layer 11 serving as ground plane. The wires for chassis backwiring will later on be strung to run in proximity to the ground plane.

Board 10 is provided with holes 12, each penetrating the thickness of the board, as well as layer 11, and being arranged in a row and column pattern commensurate with the placement and position of connector pins as connected to printed circuit cards for mounting in a chassis. Board 10 is provided with additional apertures (not shown) in the corners and/or along the margins to permit fastening of the board by means of bolts to appropriately position the board wherever positive positioning is needed. The surface of board 10 is exposed in a ring-shaped region 13, circumscribing each hole 12. These ring-shaped recesses 13 have been etched into the layer 11. Each hole 12 is thus directly surrounded by a small pad 14 which, in turn, is insulated from the remainder of sheet 11. The mounting board 10, as shown in FIG. 1, constitutes the basic support element for positioning connector pins so that wires can be strung between them, preferably by a wire wrap-machine to establish chassis backwiring as explained.

Turning now to the description of FIG. 2, a particular tool 20 is illustrated, somewhat schematically, and in a perspective view. The tool is basically comprised of a plate having circular recesses or indentations 21, and there is a central hole 22 in each recess. Each indentation or recess 21 is less than a millimeter deep, but each hole 22 traverses plate 20 completely. The holes 22 are arranged in a pattern corresponding to the pattern of the holes 12 in board 10 of FIG. 1. The tool 20 serves as a means for positioning soldering rings, such as 23, in a pattern correspsonding to the hole (12) pattern in the mounting board 10.

The soldering rings 23 are respectively placed into the recesses 21 through suitable means. For example, solder rings are disposed along one margin of plate 20; the plate has a tilted position whereby that margin has highest position. Subsequently the plate 20 is vibrated, causing the solder rings to travel down and drop into the recesses 21. The soldering rings 23 are approximately as wide as the solder ring 23, so that the latter fit into the former while the aperture 24 of a ring indexes with the respective hole 22. The recesses 21 are preferably as deep as each solder ring is thick, so that once a ring is in a recess, other rings can sweep over the more or less flush surface offered by a ring in a recess. This step is completed when all recesses are filled with solder rings.

As the next step, plate 10 is placed on tool 20 so that holes 12 respectively align with holes 22. This places each soldering ring 23 respectively in center alignment with a pad 14 of mounting board 10. The resulting relative position of the several holes is representatively illustrated in FIG. 3, showing a hole 12 of board 10 indexing a hole 22 of tool 20. The corresponding recess 21 holds a soldering ring 23, the central aperture 24 of which being aligned with both, the particular hole 12 and the particular hole 22 as they are aligned with each other.

Next, pin connector elements are placed in relation to the ground plate board 10 in that a pin, such as 31 of such a connector traverses a pair of axially aligned holes, such as 12 and 22, as well as the hole 24 in the respective soldering ring 23. In other words, the pin is threaded through the respective prepositioned soldering ring. The particular construction of the pin connectors are not of critical importance; usually an insulating connector body such as 30 accomodates two rows of pins projecting in parallel from one side of the connector body. On the other side, the connector body is provided with an elongated recess to receive a printed circuit card along the rear margin thereof, whereby terminal printed circuit etchings on the card make contact with contact fingers inside of the connector body. These contact fingers respectively are integral with the connector pins (such as 31) as projecting from the connector body.

The tool and board with pin connectors are then turned over, and as a consequence, the soldering rings 23 sit directly on the respective pads 14, isolated through the recesses 13 from the remaining portion of layer 11. The soldering rings 23 cannot misalign as they remain respectively strung on the pins. Subsequently, the tool 20 is removed. The relative position of two pins 31 as extending from a connector body 30 and in relation to two sets of aligned mounting board holes and soldering rings is illustrated in FIG. 4. Next, the soldering rings are softened (as shown for one of them) to bond pins 31 individually to the pads 14 on mounting board 10. After the solder has hardened the pins are firmly anchored to the mounted board.

It should be mentioned that soldering is only one mode of bonding and anchoring pins to the mounting board, and, more generally, this is only one mode of anchoring the pins at all. In case of soldering as described, ring recesses 13 in ground plate 11 must be sufficiently wide so that the solder, when softened, still does not connect the respective pin to the ground plate 11. However, some pins may be destined to provide and receive ground potential. For those pins, recesses 13 are not provided so that such pins are soldered directly to the ground plate.

It will thus be appreciated that by operation of the steps as described thus far, a mounting board 10 is provided with all the pins needed for wiring. The pins extend from the board in an arrangement as defined by the aperture pattern in the board, and each pin is anchored to the board so that the pin portion where bonded to the board cannot move axially or turn in the respective hole 12. It is conceivable, however, that some pins do not project straight up from the board, but through handling a pin may be bent. By that, it is specifically meant that the respective pin tip is not aligned with the axis of the respective hole 12, assumed to be at right angles to the plane of predominant extension of board 10. If the central axis of such hole 12 is not exactly colinear with the desired direction of pin extension, such direction can still be defined through a particular axis running through the center of the pin where soldered to the board (see axis 32 and center 121 in FIG. 12*a*). A pin is thus regarded as bent when the tip and at least most of the pin itself is not aligned with such an axis. The machine illustrated in a schematic overall view in FIG. 5 is designed to straighten pins which are bent.

The machine illustrated in FIG. 5 is comprised of a support base 40 on which is disposed a movable table 60, provided for receiving a ground plane board with pins attached, as described. The table 60 rides on guide rods 42*a* and 42*b*. A bridge 70 is mounted across the table and supports a vertically movable carriage assembly 80 which includes a pin twisting mechanism 90. The controls for the machine are mounted on top of bridge 70. These controls do not require elaboration. Briefly, they cause table 60 to move in direction A (or opposite thereto) in steps between predetermined positions. Also, the controls move carriage 80 up and down when the table 60 has stopped, and finally the controls operate the twisting mechanism, as will be described below.

The ground plane board with connector pins attaached is positioned flat on table 60 assumed to be horizontal. The table, in turn, is controlled for horizontal movement in direction A, to assume particular position relationships to the bridge assembly 70 and the pin twisting tool 90, on carriage 80. The pins all extend generally (but possibly not accurately) in upright direction. It is presumed that the pins are organized in rows and columns due to the particular construction of the board 10. The direction A of motion of the table is parallel to the direction of extension of the columns. As the mounting board on table 60 stops in particular positions underneath bridge 70, carriage 80 is moved down, the pin twisting tool 90 operates, the carriage 80 retracts upwardly and table 60 is moved by another step equal to the distance between rows of pins and the pin twisting cycle of the tool on carriage 80 is repeated.

Figure 6:
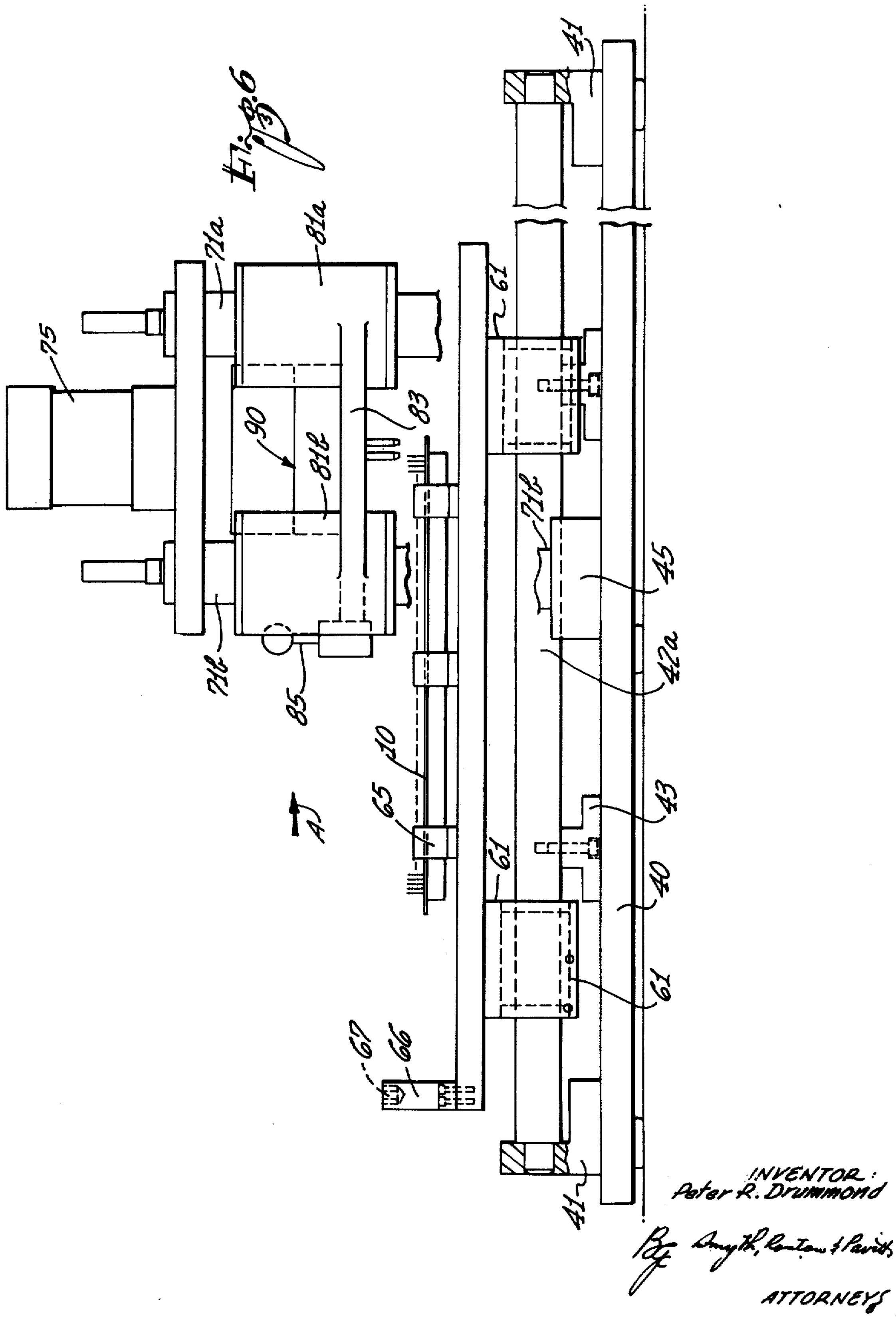
FIG. 6 is a side elevation of the machine shown in FIG. 5.
Figure 7:
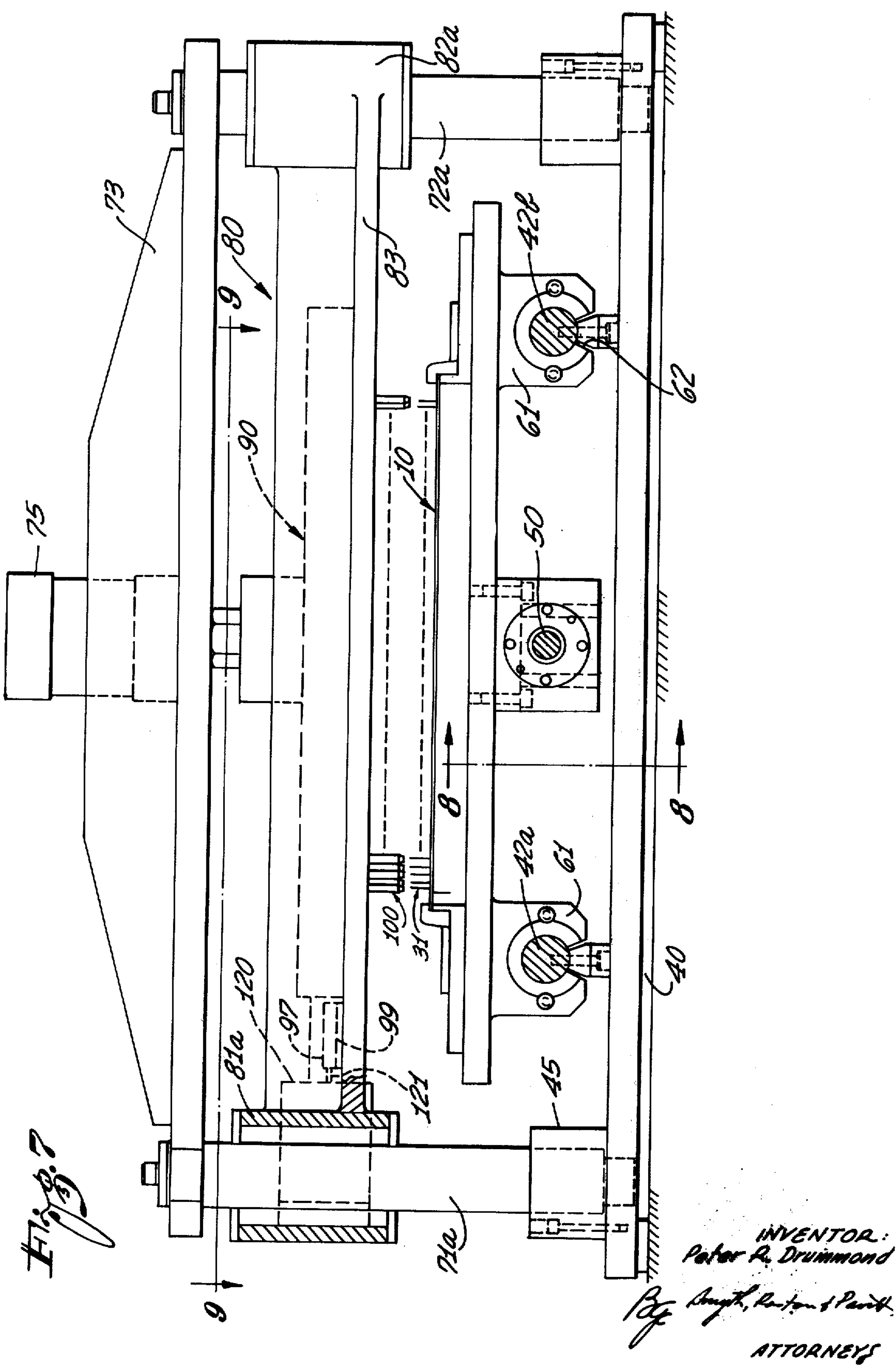
FIG. 7 is a rear view of the machine shown in FIG. 5.
Figure 8:
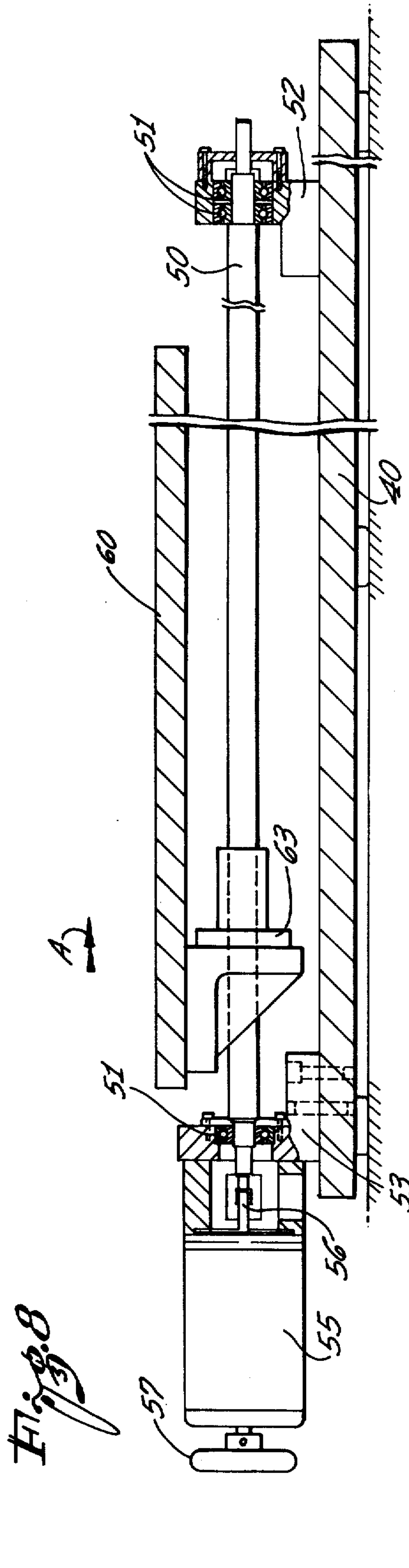
FIG. 8 is a section view of the machine shown in FIG. 5.

Proceeding now to the description of FIGS. 6, 7 and 8, two pairs of brackets 41 are mounted to support base 40 for respectively mounting the two guide rods 42*a* and 42*b* which extend in parallel to each other and in horizontal direction. The table 60 is provided with appropriate guide bushings 61 at its underside, for receiving the guide rods 42*a* and 42*b*, there being two bushings 61 per guide rod. The rods and bushings thus restrain motion of the table to be colinear with the respective axes of guide rods 42*a* and 42*b* which define direction A of permissible table movement. The bushings 61 are not completely round but have a downwardly directed slot 62 through which additional supporting elements, such as standoffs 43 may traverse. These standoffs 43 are bolted to rods 42*a* and 42*b* to prevent the respective guide rods from sagging.

A lead screw 50 is provided between the two guide rods 42*a* and 42*b*. Lead screw 50 is journaled by means of roller bearings 51 in stationary bearing housings 52 and 53 which are bolted to base 40. A motor 55 is coupled through a suitable anti-backlash coupling 56 to lead screw 50 for driving same. A hand wheel 57 permits manual rotation of the lead screw. A ball nut 63 is mounted to the underside of table 60 and is threadably received by lead screw 50.

As motor 55 rotates lead screw 50, the table 60 moves parallel to the axis of the lead screw and in direction A, or opposite thereto, depending upon the sense of rotation imparted by motor 55 upon lead screw 50. As stated above, the motor is suitably position-controlled to accurately position table 60 and to move the table for precise distance between accurately defined positions.

The table 60 is provided with fastening means 65 for a mounting board 10 to retain the mounting board in particular position on the table. It will be recalled that such a board 10 could be provided with particular apertures so as to bolt the board to the fastening blocks for accurately positioning the board on the table. An indexing tool 66 is provided on table 60 having a particular predetermined relationship to the fastening means 65, and these, in turn, have particular relationships to the rows and columns of pins on board 10 when retained by the fastening means. Upon mounting the board to the table, these pins obtain individually fixed position relationship to indexing tool 66.

The indexing tool 66 has a recess 67 for receiving an indexing pin 85 on carriage 80. This defines a particular position relation between carriage 80 and the pins on board 10. All operating positions of table 60, and all distance between such positions in direction and along direction A of table motion are referenced against the indexing position. The indexing defines also a particular position in the horizontal, along direction B, which is parallel to the extension of the rows of the pins on the board. One can state it differently, for proper operation of the machine it is necessary that the operation proceeds from an indexing position between indexing pin 85 and indexing aperture 67, so that, in turn, particular positions between the pins and the pin straightening and twisting tool on carriage 80 can be established through accurate motion and positioning control for table 60, using the indexing position of the table as a reference.

The bridge 70 is constructed to have two pairs of posts, 71*a*, 71*b* and 72*a*, 72*b*, anchored to the support 40 by means of rings or sleeves 45, and maintained in parallel and vertical orientation through a traverse 73. The housings for the control elements are mounted on the traverse, but are not shown in FIG. 6, et seq. The vertically movable carriage 80 has sleeve-like bushings 81*a*, 81*b*, 82*a* and 82*b* to ride on these vertical posts, as respectively indicated in the drawings, for movement in vertical direction C. The central portion of carriage 80 is bolted to a vertically extending rod 86, which serves as a suspension and drive element for the carriage. (Actually, the rod is secured to the top of a housing for the pin twisting mechanism 90, which, in turn, is secured to the bridge 80.) Rod 86 extends from a suitable, reversible drive such as a pneumatic piston drive 75, which is mounted on top of traverse 73. Therefore, it appears that carriage 80 is suspended from the traverse 73 by means of rod 86 and is driven up and down by the drive element 75.

Extending now the description to include FIGS. 9, 10 and 11, carriage 80 is comprised of a bottom plate 83 with a slot 84 (see FIG. 10). The bushings 81*a*, etc., are integral with that bottom plate. The pin twisting tool 90 is mounted on bottom plate 83, on top of slot 84. A housing 91 is mounted on the plate 83 and a cover or retaining plate 92 is bolted to housing 91. (Rod 86 is bolted to plate 92 for suspending the carriage.) A pair of actuator bars 93 and 93*a* is positioned in housing 91 and racks 94 and 94*a* are respectively bolted to the actuator bars. Racks and bars are positioned for movement in direction of double arrow B which extends in the horizontal, and exactly at right angles to arrow A. As stated above, double arrow B is parallel to the direction of extension of the rows of pins on board 10 when on table 60.

The racks 94 and 94*a* are respectively in engagement with pinions, such as 101 and 101*a*. These pinions pertain to rotating heads or chucks 100 arranged in two rows parallel to all of the rows of pins on the mounting board. A pair of positioning guide elements, such as 95 and 95*a*, on for each of the rack-bar combinations permits adjustment of the racks as to the degree of threaded engagement with the pinions 101. Thus, the depth of teeth penetration of a rack and the pinions of a row can be adjusted by shifting the respective guide element laterally so that, in turn, the degree of slack as between rack and pinions is adjustable therewith. Manually adjustable eccentric pins 96 in retainer plate 92 engage a groove in the guide elements; there are two pins for each of the guide elements 95 and 95*a*. Adjustment of the eccentric pins positions the guide elements laterally and individually, which is an adjustment in direction colinear with direction A.

The two actuators 93 and 93*a* are interconnected at one respective end by a bridge element 97 having apertures 97*a* which are laterally elongated, so that pins 98 in actuators 93 and 93*a* can laterally slide in the direction of arrow A, as well as relative to each other, commensurate to position adjustment of the actuators through eccentric pins 96. Bridge 97 provides positive interconnection as far as joint, parallel movement for the actuators 93 and 93*a* in direction of double arrow B is concerned. Bridge 97 is retained by and slides in guide brackets 99. Bridge 97 is connected to a control and actuator rod 121 which, in turn, is driven by a suitable drive 120, such as a pneumatic, hydraulic, electric, or any other drive, to ultimately move the racks 94 and 94*a* in direction of double arrow B for providing the pin twisting operation to be described more fully below.

The individual pin twisting tools comprise a plurality of chuck elements such as 100. Each chuck has a pinion 101 and is integral therewith. As was mentioned above, the pinions mesh with one of the racks which, in turn, are driven by drive 120. The several chucks have the form of hollow, tubular elements, and they are retained in position through bearings 102 and 103 respectively in housing 91 and cover plate 92. As can be seen best in FIG. 10, the bottom of housing 91 has openings above slot 94 of carriage bottom 83; the several bearings 102 are inserted in the openings in the bottom of housing 91 and they project into slot 84. Bearings 103 are inserted in recesses in cover plate 92 which are aligned individually with the openings in the bottom of housing 91. The several chucks 100 project below this bottom plate 83.

It, therefore, appears that the several chucks 100 can rotate about vertical axes in joint operation upon operation by drive 120. Moreover, all the chucks move up and down as carriage 80 is moved up and down and rides on the posts 71, 71*a*, etc. This direction of motion is colinear with the axis of each of the chucks 100, which, in turn, is precisely perpendicular to the horizontal plane as defined through arrows A and B. This direction has been denoted as direction C. Particularly now, this direction is parallel to the desired position axes of the pins on board 10 when on table 60.

The chucks 100 are arranged in two rows and in a staggered relationship. The outer-to-outer distance between two chucks in the same row (operated by the same rack) is equal to twice the outer-to-outer spacing between two pin columns (or between two pins in the same row). The distance between the two rows of chucks is an integral multiple of the spacing of the rows of pins in direction A. How far the two rows of chucks are apart is dictated primarily by the physical dimensions of the chucks, as there must be sufficient space to accomodate the structure of the chucks, as well as the bearings, and there must be sufficient spacing between the bottom openings in housing 91 for reasons of strength. The number or rows of chucks is of no importance and the number 2 is selected only because usually the pins in each row are too close to have an equal number of chucks in one row. Thus, in each row of pins, only every other pin is straightened during one cycle. This is the reason for providing two rows of chucks in staggered relationship. There is an additional consideration which will be described more fully below.

Each chuck 100 is provided with a tapered end 105 near its tip. A central recess 106 in the chuck tip receives an insert of hardened material 107, which has an aperture 108 of square-shaped cross section (see FIG. 10*a*). Particularly aperture 108 has cross sectional profile dimensions comparable with the cross section of a pin. That aperture merges into an outwardly flared, frusto-conical surface 109. The "base" of the cone of frusto-conical surface 109 defines a relatively wide entrance opening for the chuck and becomes narrower towards bore 108. Each chuck has, in addition, a central bore 110, the diameter of which is slightly larger than the corner-to-corner diameter of the square-shaped aperture 108. Bore 110 traverses the entire chuck, so that upon pushing a rod through bore 110 from the other end, insert 107 of the chuck can be removed from recess 106. As the principal wear is on the inserts 107, their periodic exchange is a necessary upkeep.

Proceeding now to the description of operation of the machine illustrated in FIGS. 5 through 11, it is thus presumed that a board 10 has been prepared by insertion and anchoring of pin connectors as shown in FIG. 4. That board will now be fastened on table 60 in the particular position as determined by the fastener elements. The machine drive will be adjusted through indexing (85–66) and the starting position for the table 60 is obtained from there.

In operation the table 60 is advanced in direction A until the first row of pins is in alignment with the first row of chucks. This requires a more detailed definition and for particulars as to the resulting relationship between a chuck and a pin, FIGS. 12*a* through 12*d* should be consulted. Through position control and particularly due to adjustment of the motion control on basis of prior indexing, the table 60 will stop in a position in which the chucks of the first row of chucks are particularly positioned in relation to every other pin of the first row of pins. This position is defined in that the respective axis 111 if a chuck is in alignment with a center axis 32 which traverses the respective center 121 of a pin at its anchoring area. Axis 32 for each pin defines the desired orientation of the pin. Such an axis 32 will generally coincide with the center axis of the respective aperture 12 in board 10 for the pin, if the pin 31 traversing this aperture 12 is properly positioned. In other words, the center line of a straight pin will be colinear with the axis 32 of desired pin position, and this axis, in turn, will be coaxial with the axis 111 of the chuck above, as shown in FIG. 12*a*, through position control for the table 60.

If a pin is bent, it will have been bent with a fulcrum point near the surface of mounting board 10, i.e., close to point 121, and the tip 33 of such a pin will not be on the axis 32. As the drive 75 lowers carriage 80, (direction C), the particular chuck moves on the axis 111 and the entrance opening of the chuck, as defined by the lower edge of flared wall portion 109 thereof approaches the respective pin tip.

Figure 12:
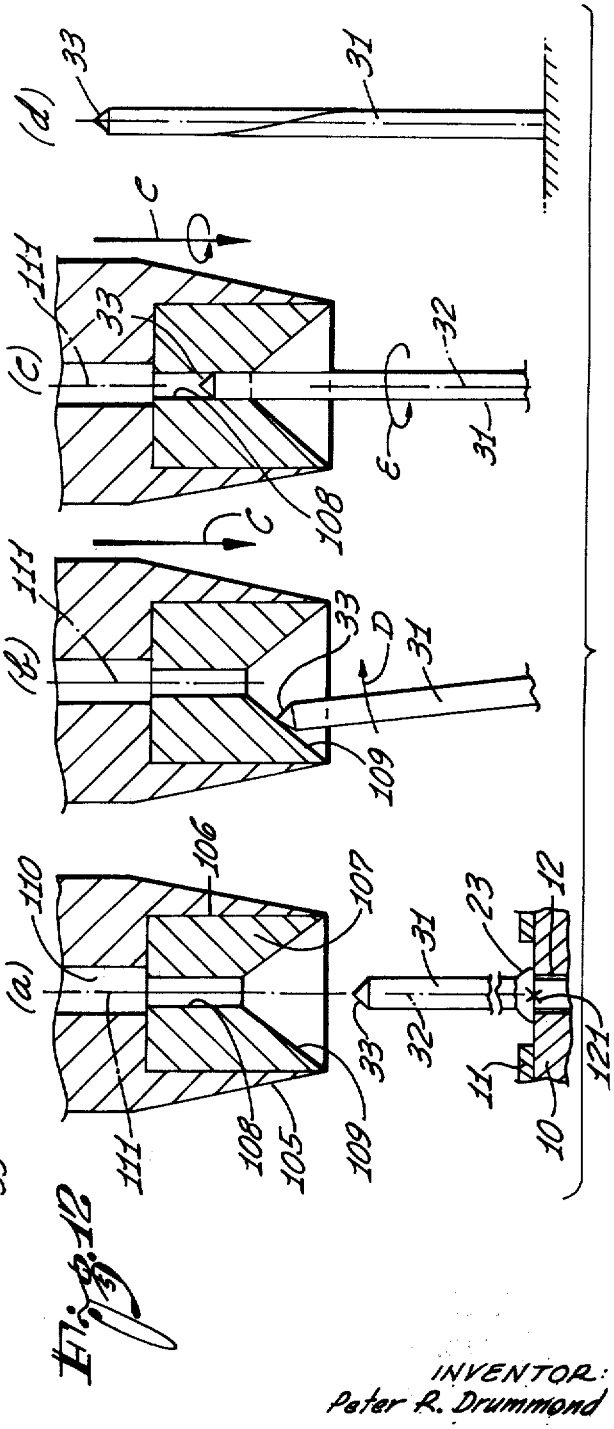

In FIG. 12*b*, a bent tip is presumed and as the chuck proceeds, tip 33 of the bent pin will engage the flared wall portion 109 and will be urged towards axis 111 (direction D). This deflection is a direct one, there are no deflection oscillations of the pin relative to axis 111. In general, it cannot be presumed that the pin will be bent permanently by this deflection. In most cases, the deflection will occur well within the proportional limit of bending stress-strain relation. Therefore, the deflection will be practically completely reversible and the pin could return to the bent position if the chuck were lifted again and the deflecting force were removed.

Upon continuation of the downward motion (C) of the chuck, the square tip 33 of pin 31 will enter the square aperture 108. The downward motion is terminated when the tip portion of the pin, such as 10% or even less of the entire length of the pin, has been inserted into that square aperture 108 (FIG. 12*c*). This insertion takes place regardless whether the pin was bent or not. If the pin was bent, however, the deflection as was provided by surface 109 for forcing the pin into alignment with axis 111 will be reversible or at least to a substantial degree reversible. Thus, such a pin is only restrained from bending back and out of alignment with axis 32, the pin is not yet permanently straightened.

The possibility arises that the square profile (in the horizontal plane, normal to direction C and axis 111 of aperture 108) was angularly displaced (in a horizontal plane) relative to the square cross sectional profile of pin 31. However, as was mentioned above, there is some rotational slack in the mounting of each chuck (teeth depth penetration adjustment of rack 94 (or 94*a*) and of pinion 101). This permits the chuck to turn about axis 111 to angularly align itself with the pin profile orientation just prior to insertion of pin tip 33 into aperture 108; thus, the mating profiles will obtain matching position relation permitting insertion of the pin tip into aperture 108.

During the next phase of operation, drive 120 is actuated and pushes actuator rods 93 and 93*a* for providing motion to the racks 94 and 94*a*; particularly the rack engaging the pinions of the several chucks of the first row is actuated to cause the chucks to rotate. As the pins have a nonround profile in the horizontal plane of rotation, the respective pin tips are forced to follow that rotation. In other words, pins are coupled to chucks to permit transmission of torque. As the other end of the portion of any pin projecting from mounting board 10 is anchored to the board (through the soldering previously described) that end remains in position, i.e., does not follow the chuck rotation. Accordingly, the pin 31 is twisted (arrow E) about its longitudinal center line, coinciding with the colinear axes 111 and 32 in that position. To state it differently, the pin is twisted around the axis (32) of desired pin position into which the pin has been urged previously; while still prior thereto the axis (111) of rotation of the chuck was placed in coaxial alignment with that desired axis 32.

Twisting proceeds beyond the torsional elastic limit, which, in effect, destroys the previous "bending memory" of the pin. After twisting the pin, for example, by 180°, as far as angular tip displacement is concerned, the force which is applied by drive 120 to the rack is released. For example, if drive 120 is a pneumatic drive, there is now an exhaust phase which removes driving force from the racks. Instead, the twisted pins may apply a torque upon the chucks, permitting even some driving of the racks in the opposite direction. This torque as provided by the pins results from elastic relaxation.

However, as was stated above, the elastic limit was exceeded during the twisting phase so that the relaxation will by only a slight one. By no means will there be complete reversal. If twisting was sufficiently severe so that even the stress limit was exceeded, there may be no relaxation effect at all. This depends on the pin material, on the dimensions of the pin, and on the angle of twisting. For pins of the type mentioned above, 180° was found to suffice, but the pin could be twisted for over 360° before breaking. In any event, after permitting such relaxation, an operating state exists in which there is no interaction of forces and torques as to rotation within the plane AB as far as racks, chucks and pins are concerned. The chucks can thus be withdrawn subsequently from the respective pin tips, in vertical direction without applying a pulling force upon the pins. During an operating phase succeeding the relaxation phase, carriage 80 is lifted by the drive 75 and the chucks recede from the twisted pins.

During the next step, table 60 is moved in direction A over a distance equal to the distance between two rows of pins on board 10. Thereafter carriage 80 is lowered again, pins are twisted, the carriage retracts, etc. One can see that in sequential steps, i.e., in cyclically repeated operating phases as described, each chuck twists all the pins of one column, adjacent pins in the same row are sequentially twisted by chucks in different rows.

As was explained above, the chucks are arranged in two rows because the pins in each row are rather close together. Moreover, it is desirable to make the flared entrance 109 rather wide so as to "catch" pins which are rather severely misaligned. The chuck tips have another feature, according to which the tip is tapered at 105, directly adjacent the flared entrance of a chuck. Should a pin be bent so severely that its tip misses the flared opening 109, then it will gradually be bent outwardly by the taper 105 and will not be squashed. Such a pin will, of course, not be straightened, but will stand out as severely bent. It can then be straightened, for example, manually and/or will be eliminated from the list of pins to be interconnected by the wiring machine and wiring involving this pin will be done manually.

As was described, a square cross section of the pins and a correspondingly shaped aperture 108 permits application of a torque around the axis of the pin, normal to the square. This is only one example, and one can see that torque can be imparted by the chuck upon the pin as long as the pins and mating aperture 108 have not completely round cylindrical surfaces. Thus, triangular, rectangular, oval, or cross sections or a circular cross section with lugs and mating grooves, etc., all permit torque transfer after insertion of such a pin into the mating chuck insert. If the pins are completely round, an additional clamping force would have to be applied by appropriately constructed chucks. After all pins have been twisted, the board 10 is removed from table 60 and the straightened pins are ready for backwiring.

The pins straightening machine and particularly the pin straightening process has been described in that there are as many chucks as there are pins in a row and that each pin on the board is straightened, through twisting, regardless whether a pin actually needs straightening. The following modifications are well within the scope of the present invention. There may be only a single row of chucks, straightening only every other pin of any row. After running through all pins of every other column, the table 60 is shifted sideways (or tool 90 is) in direction B for a distance equal to the distance between two pin columns, to stepwise straighten all pins of the interspaced columns.

The machine may have only a single chuck, and table and chuck are movable relative to each other in the AB directional system (analogous to an X-Y coordinate system). For example, the table 60 moves along, as described; a single chuck is mounted on a carriage 80 to move in steps in direction B and through joint control the chuck is aligned with any pin for straightening as described.

The method of the invention may include the sensing and detection of bent pins. Through particular A-B position control the chuck is aligned with these pins only for straightening them, leaving the others untwisted. For this, use can be made of the fact that so-called X-Y tables are well known and used, being equipped for position control within a two-dimensional coordinate system. Either the chuck or the board with pins can be mounted on such a table. The detection of bent pins may have resulted in X-Y coordinate values defining their positions on board 10. These coordinates are recorded, for example, on tape, and control the X-Y table. The equipment is thus controlled to place the chuck sequentially in alignment with those coordinates on the board. Finally, it should be mentioned that any of the power-driven motions as described above, can be carried out manually, using sufficiently accurate position indicators to aid the operator.

The invention is not limited to the embodiments described above, but all changes and modifications thereof not constituting departures from the spirit and scope of the invention are intended to be covered by the following claims.

I claim:

1. The method for preparing connector pins for backwiring to individually assume particular alignment with particular axes, wherein said pins are arranged in a matrix pattern on a mounting board and anchored thereto, comprising the steps of:

urging the pins individually at their respective tips into respective alignment with the particular axis for each pin if misaligned; and twisting the pins individually around the respective axis beyond the torsional elastic limit.

2. The method for preparing plural connector pins for backwiring to individually assume particular alignment with particular axes, wherein said pins are arranged in a matrix pattern on a mounting board, comprising the steps of:

assembling and positioning the pins in a particular pattern for backwiring so that the respective tips extend toward a particular plane transverse to said axes;

anchoring the pins as assembled individually and remote from their respective tips to resist rotary movement where anchored, the pins where anchored having their respective center line coinciding with an axis of the particular axes;

urging the pins individually at their respective tips, respectively into alignment with the particular axis for each pin if misaligned; and applying a twisting force to the respective tip of each of the pins around the respective axis and beyond the elastic limit for torsional deformation.

3. The method for preparing connector pins for backwiring to individually assume particular alignment with particular axis comprising the steps of:

first, providing a board with a plurality of apertures;

second, positioning a plurality of pin connectors on the board so that the pins of the several connectors respectively traverse the apertures of the board and projecting with their respective ends from the board;

third, securing the pins remote from their ends to the board to resist rotation in the respective aperture of the board upon application of torque upon the pins;

fourth, urging the respective tips of the pins into respective alignment, if misaligned, with axes transverse to the board and respectively traversing the centers of the apertures;

fifth, engaging the tips of the pins of the plurality respectively with rotating elements;

sixth, causing rotating elements to turn through particular angles, thereby respectively applying twisting force to the pins;

seventh, relaxing the application of twisting force to the pins after the elastic limit for torsional deformation has been exceeded; and eighth, withdrawing the rotating element from the pins.

4. The method as set forth in claim 3, the securing step including placement of soldering rings around each pin on board and heating the soldering rings to anchor the pins to the board.

5. The method as set forth in claim 3, the fourth through eight steps being effective concurrently for a first plurality of said pins, a ninth step providing for repetition of the fourth through eighth step for further pluralities of pins.

6. The method for straightening a bent connector pin, wherein said pin includes a unitary free standing body having a surface contour permitting application of a twist to the body and wherein said pin is supported in a mounting board and anchored thereto to prevent rotation of the pin when said pin body is twisted, comprising the steps of nonoscillatorily urging the pin directly into alignment with a straight axis, and twisting the pin around the axis beyond the limit of torsional elastic deformation.

7. The method for preparing connector pins for backwiring, comprising the steps of:

assembling the pins on a board to extend from the board and anchoring the assembled pins to the board;

urging the pins individually into respective alignment with a plurality of parallel axes; and twisting each pin at its respectively projecting end around the respective axis.

8. The method as set forth in claim 7, providing a board with apertures in a particular pattern;

arranging a plurality of solder rings in a like pattern;

aligning the apertues of the board with the solder ring pattern;

introducing pins into the apertures to respectively also traverse the solder rings; and heating the solder rings to anchor the pins to the board.

9. The method as set forth in claim 7, the urging and twisting operations being performed on a plurality of pins in one cycle, the method including the step of repeating the cycle for a different plurality of pins.

10. A method for aligning pins in a matrix so as to make them suitable for automatic wire wrapping comprising the steps of:

bonding said pins to said matrix so that they cannot rotate;

engaging a portion of all pins so that they are in the desired alignment, said engagement step including a deflection of all misaligned pins into the desired alignment position; and twisting the engaged portion of the pin so that all points on the portion of the pin between the portion bonded to the matrix and the portion engaged are permanently angularly displaced from their original position.

11. The method as claimed in claim 10, wherein said pins are engaged at a relatively small portion at the end not bonded to the matrix.

12. A method of changing the position of a bendable post and fixing the post in a prescribed new position, comprising the steps of:

a. bending said post into said new position from a position displaced therefrom, and b. twisting the post generally about its axis whereby when it is released it remains in said new position.

13. The method of claim 12 further characterized by and including the step of:

a. holding said post in said prescribed new position while twisting it.

14. A method of straightening the wire wrap post of an electrical terminal seated in base means, whereby the post is moved from misalignment with a prescribed axis of the terminal to alignment therewith and fixed on said axis, comprising the steps of:

a bending said post into alignment with said axis, and b. twisting said post about said axis whereby when it is released it remains fixed on said axis.

15. A method of straightening the wire wrap post of an electrical terminal seated in base means, whereby the post is moved from misalignment with a prescribed axis of the terminal to alignment therewith and fixed on said axis, comprising the steps of:

a. bending said post into alignment with said axis, and b. twisting said post about said axis beyond the torsional elastic limit so that when the post is released it remains fixed on said axis.

16. A method of straightening the wire wrap post of an electrical terminal seated in base means, whereby the post is returned from misalignment with the longitudinal axis of the terminal to alignment therewith and fixed on said axis, comprising the steps of:

a. bending said post into alignment with said axis, b. twisting the post in one direction on said axis through a first predetermined number of degrees of arc from its original radial orientation on said axis, so that the post does not return to its original radial orientation on said axis.

17. The method of claim 16 further characterized by and including the step of:

a. twisting the post in one direction by more than 90° of arc from its original radial orientation on said axis.

18. A method of straightening the elongated wire wrap post of an electrical terminal extending from an anchoring means in the base means, whereby the elongated post is returned from misalignment with the longitudinal axis of the terminal to alignment therewith and fixed on said axis, comprising the steps of:

a. bending said post into alignment with stand axis, b. twisting the post in one direction on said axis through a first predetermined number of degrees of arc from its original radial orientation relative on said axis, so that said post does not return to its original radial orientation on said axis; and c. distorting the metal of said post in said twisting step in an area between the tip and the anchoring means.

19. A method of straightening the elongated wire wrap post of an electrical terminal extending from base means, whereby the elongated post is returned from misalignment with the longitudinal axis of the terminal to alignment therewith and fixed on said axis, comprising the steps of:

a. bending said post into alignment with stand axis;

b. engaging the post near its tip, c. twisting the post in one direction on said axis through a first predetermined number of degrees of arc from its original radial orientation relative on said axis, thereby distorting the metal of said post in an aarea in between the tip and an area immediately adjacent the base means.

20. A method of straightening randomly positioned misaligned wire wrap posts of electrical terminals in a group of terminals seated in base means, whereby the misaligned posts are returned from misalignment with the longitudinal axes of corresponding terminals to alignment therewith and fixed on said axes, comprising the steps of:

a. gripping each wire wrap post in said group of terminals is such a manner that said misaligned wire wrap posts are bent into alignment with corresponding terminal axes and all the posts in said group are in alignment with corresponding axes, b. twisting all of said posts in one direction on corresponding axes through a first predetermined number of degrees of arc from their original radial orientation on said corresponding axes, so that all of said posts do not return to their radial orientation on said corresponding axes.

21. The method of claim 20 further characterized by and including the step of:

a twisting all said posts in one direction through more than 90° of arc from their original radial orientation on corresponding axes.

* * * * *